(12) United States Patent
Kim et al.

(10) Patent No.: US 12,460,838 B2
(45) Date of Patent: Nov. 4, 2025

(54) PTC HEATER

(71) Applicant: Hanon Systems, Daejeon (KR)

(72) Inventors: Jong Su Kim, Daejeon (KR); Dong Won Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 804 days.

(21) Appl. No.: 17/420,226

(22) PCT Filed: Jan. 16, 2020

(86) PCT No.: PCT/KR2020/000769
§ 371 (c)(1),
(2) Date: Jul. 1, 2021

(87) PCT Pub. No.: WO2020/159122
PCT Pub. Date: Aug. 6, 2020

(65) Prior Publication Data
US 2022/0146148 A1    May 12, 2022

(30) Foreign Application Priority Data
Feb. 1, 2019 (KR) .......... 10-2019-0013603

(51) Int. Cl.
*F24H 9/1863* (2022.01)
*F24H 3/04* (2022.01)
*H05B 3/32* (2006.01)

(52) U.S. Cl.
CPC ......... *F24H 9/1872* (2013.01); *F24H 3/0435* (2013.01); *F24H 3/0464* (2013.01); *H05B 3/32* (2013.01); *H05B 2203/02* (2013.01)

(58) Field of Classification Search
CPC .... F24H 3/0435; F24H 3/0464; F24H 9/1872; H05B 2203/02; H05B 3/32

USPC ........................................................ 219/540
See application file for complete search history.

(56) References Cited

U.S. PATENT DOCUMENTS

| 2007/0114217 A1 | 5/2007 | Bohlender et al. |
| 2009/0139983 A1* | 6/2009 | Luppold .............. B60H 1/2225 |
| | | 219/530 |

FOREIGN PATENT DOCUMENTS

| CN | 104302495 A | 1/2015 |
| CN | 104470740 A | 3/2015 |
| KR | 19990035657 A | 9/1999 |
| KR | 20130112386 A | 10/2013 |
| KR | 20140083290 A | 7/2014 |
| KR | 20150098856 A | 8/2015 |

(Continued)

OTHER PUBLICATIONS

International Search Report issued in PCT/KR2020/000769 on Apr. 27, 2020.

(Continued)

*Primary Examiner* — Sang Y Paik
(74) *Attorney, Agent, or Firm* — NORTON ROSE FULBRIGHT US LLP (57) ABSTRACT

A PTC heater including: a PTC element heating part configured to generate heat; and a pair of heat dissipating plates disposed at two opposite sides of the PTC element heating part, respectively, so as to be in contact with the PTC element heating part and having a plurality of flow holes, in which the heat dissipating plates have heat dissipating fins each connected to one side of each of the flow holes and bent to a space between the heat dissipating plates.

11 Claims, 9 Drawing Sheets

(56) References Cited

FOREIGN PATENT DOCUMENTS

KR     20170090235 A     8/2017
KR     20180065044 A     6/2018

OTHER PUBLICATIONS

Office Action issued on Mar. 31, 2023 by the KIPO in the corresponding Patent Application No. 10-2019-0013603, with English translation.

* cited by examiner

PTC HEATER

CROSS REFERENCE TO RELATED APPLICATIONS

This application is a national phase under 35 U.S.C. § 371 of International Application No. PCT/KR2020/000769 filed on Jan. 16, 2020, which claims the benefit of priority from Korean Patent Application No. 10-2019-0013603 filed on Feb. 1, 2019. The entire contents of these applications are incorporated herein by reference in their entirety.

TECHNICAL FIELD

An embodiment relates to a PTC heater. In more detail, the embodiment relates to a PTC heater having a heat dissipating part with a structure modified to improve heat dissipating efficiency.

BACKGROUND ART

A PTC (positive temperature coefficient) element heating part is a kind of element having properties in which an electrical resistance value increases as a temperature increases. Because of stability accompanied by the properties, the PTC element heating part is widely used for a temperature sensor or a constant-temperature heating element, and the like. In particular, because there is no concern that a fire occurs due to excessive heat in the event of a vehicle accident, the PTC element heating parts are widely used for heating devices for heating coolants or air in air conditioning devices for vehicles. Because the PTC element heating part autonomously prevents a temperature thereof from being increased to a specific temperature or higher, the PTC element heating part does not require a separate temperature control device or a separate safety device during use, such that the number of required components and manufacturing costs may be advantageously reduced.

The PTC element heating part is used for a heater of an air conditioning device for a vehicle. In the case of a low-heat source engine (diesel engine), a low-voltage PTC element heating part is applied to a rear side of a hot water heater and used as a component for improving heating performance.

Figure 1:
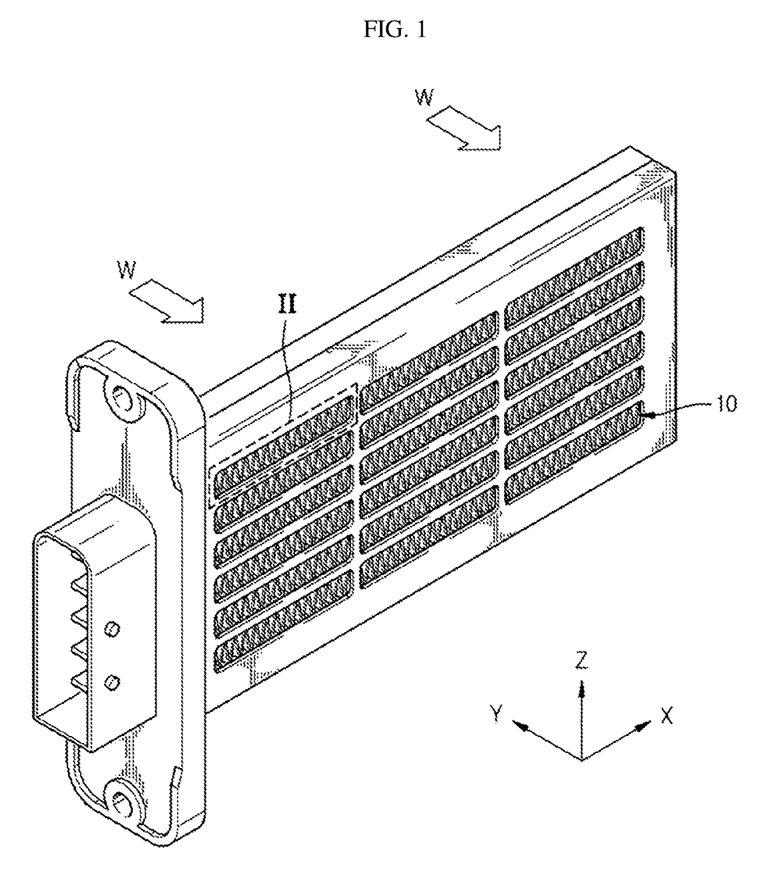
FIG. 1 is a perspective view schematically illustrating a PTC heater in the related art.
Figure 2:
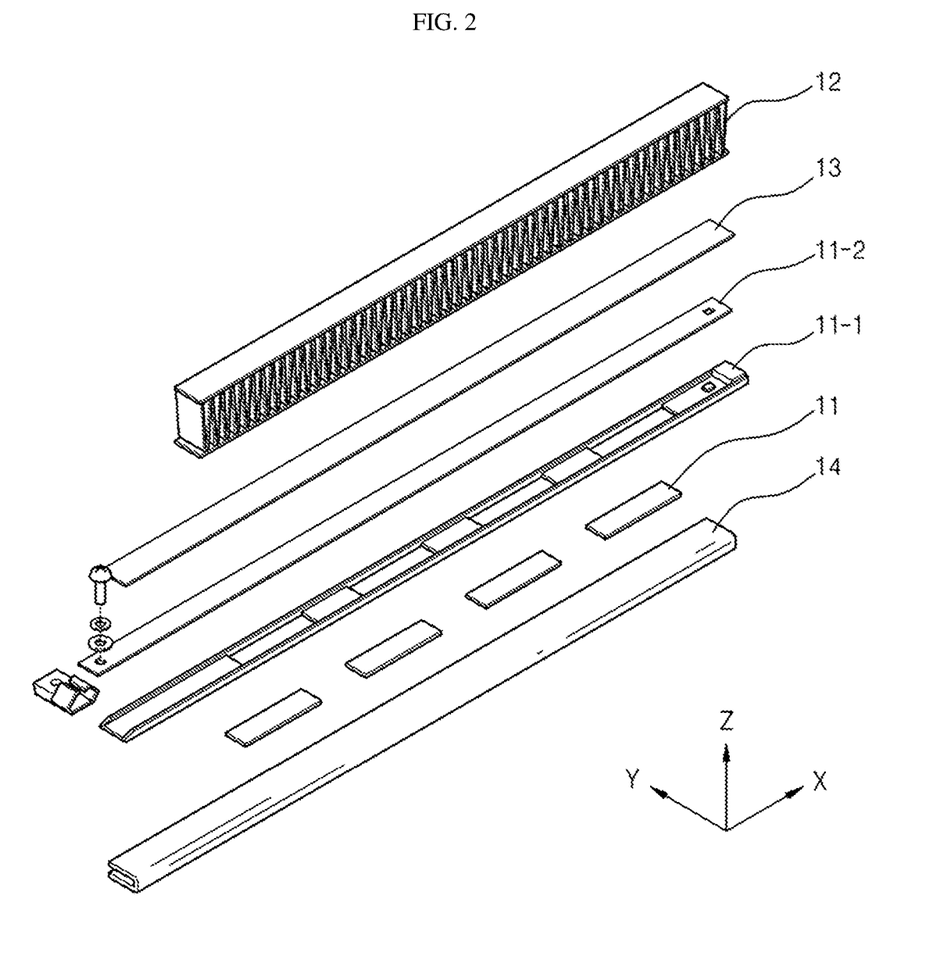
FIG. 2 is an exploded perspective view of part II illustrated in FIG. 1.

FIG. 1 is a perspective view schematically illustrating a PTC heater 10 in the related art, and FIG. 2 is an exploded perspective view of part II illustrated in FIG. 1, that is, an exploded view of one cell in the PTC heater 10 that includes a PTC element heating part 11, a terminal plate 11-2, an aluminum tube 14, a guide 11-1, an insulating sheet 13, and a heat dissipating fin 12.

A schematic operating process of the PTC heater 10 in the related art will be described. First, when a current is applied to the PTC element heating part 11 through the terminal plate 11-2, the PTC element heating part 11 generates heat. The generated heat is transferred, through the aluminum tube 14, to the heat dissipating fin 12 positioned at the upper side or a heat dissipating fin (not illustrated) positioned at the lower side, and the heat dissipating fin 12 provided with the heat exchanges heat with an introduced fluid, thereby transferring the heat generated from the PTC element heating part 11 to the fluid.

Because the heating performance of the vehicle depends on the performance of the heat dissipating fin, there is a consistent effort to increase the heat exchange effect of the heat dissipating fin.

DISCLOSURE

Technical Problem

An object of an embodiment is to improve heat exchange performance by changing a structure of a heat dissipating part while minimizing a waste of materials.

Technical problems to be solved by the present invention are not limited to the above-mentioned technical problems, and other technical problems, which are not mentioned above, may be clearly understood by those skilled in the art from the following descriptions.

Technical Solution

An embodiment of the present invention provides a PTC heater including: a PTC element heating part configured to generate heat; and a pair of heat dissipating plates disposed at two opposite sides of the PTC element heating part, respectively, so as to be in contact with the PTC element heating part and having a plurality of flow holes, in which the heat dissipating plates have heat dissipating fins each connected to one side of each of the flow holes and bent to a space between the heat dissipating plates.

In particular, the flow hole may have a rectangular shape having horizontal and vertical lengths different from each other, and the heat dissipating fin may be connected to a side having a short length.

In particular, the flow holes may be disposed in a plurality of columns or a plurality of rows.

In particular, the heat dissipating fins may be bent to fix the PTC element heating part.

In particular, the heat dissipating fins in the flow holes disposed in the same row may be disposed in the same direction.

In particular, the heat dissipating plates may include a first heat dissipating plate and a second heat dissipating plate disposed to face each other, and a first flow hole formed in the first heat dissipating plate and a second flow hole formed in the second heat dissipating plate may be disposed to face each other.

In particular, the heat dissipating fins disposed in the plurality of columns on the first heat dissipating plate and the second heat dissipating plate may be alternately disposed in the same row.

In particular, when the first flow hole and the second flow hole face each other, a first heat dissipating fin provided on the first heat dissipating plate and a second heat dissipating fin provided on the second heat dissipating plate may be disposed at positions obliquely facing each other and bent to the space between the heat dissipating plates.

In particular, a maximum depth by which the first heat dissipating fin and the second heat dissipating fin are bent may be smaller than a spacing distance between the first heat dissipating plate and the second heat dissipating plate.

In particular, the PTC element heating part may include: a PTC element; a current supply part disposed above the PTC element and configured to supply a current; an insulator disposed above the current supply part; and a tube configured to accommodate the PTC element, the current supply part, and the insulator sequentially disposed, and the heat dissipating fins may be disposed in a first row of the flow holes of the heat dissipating plate which is in contact with a heat generating surface of the PTC element between the first heat dissipating plate and the second heat dissipating plate.

The flow holes and the heat dissipating fins of the first heat dissipating plate and the second heat dissipating plate may be symmetrically provided with respect to the PTC element heating part.

Advantageous Effects

According to the embodiment, it is possible to increase the heat transfer efficiency by improving the structure of the heat dissipating part and to uniformize the surface temperature of the heat dissipating part.

The various, beneficial advantages and effects of the present invention are not limited to the above-mentioned contents and may be more easily understood during the process of describing the specific embodiments of the present invention.

EXPLANATION OF REFERENCE NUMERALS AND SYMBOLS

1: PTC heater
30: Housing part
31: Housing
32: Holder
33: Terminal
100: PTC element heating part
110: PTC element
111: Guide part
120: Current supply part
130: Insulator
140: Tube
200: Heat dissipating plate
200a: First heat dissipating plate
200b: Second heat dissipating plate
210: Flow hole
210a: First flow hole
210b: Second flow hole
230: Heat dissipating fin
230a: First heat dissipating fin
230b: Second heat dissipating fin

BEST MODE

Hereinafter, embodiments of the present invention will be described in detail with reference to the accompanying drawings.

However, the technical spirit of the present invention is not limited to some embodiments described herein but may be implemented in various different forms. One or more of the constituent elements in the embodiments may be selectively combined and substituted within the scope of the technical spirit of the present invention.

In addition, unless otherwise specifically and explicitly defined and stated, the terms (including technical and scientific terms) used in the embodiments of the present invention may be construed as the meaning which may be commonly understood by the person with ordinary skill in the art to which the present invention pertains. The meanings of the commonly used terms such as the terms defined in dictionaries may be interpreted in consideration of the contextual meanings of the related technology.

In addition, the terms used in the embodiment of the present invention are for explaining the embodiments, not for limiting the present invention.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms first, second, A, B, (a), and (b) may be used to describe constituent elements of the exemplary embodiments of the present invention.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Hereinafter, embodiments will be described in detail with reference to the accompanying drawings. The same or corresponding constituent elements are assigned with the same reference numerals regardless of reference numerals, and the repetitive description thereof will be omitted.

FIGS. 3 to 8 clearly illustrate only main features for conceptually and clearly understanding the present invention. As a result, various modifications of the drawings are expected, and the scope of the present invention need not be limited to particular shapes illustrated in the drawings.

Figure 3:
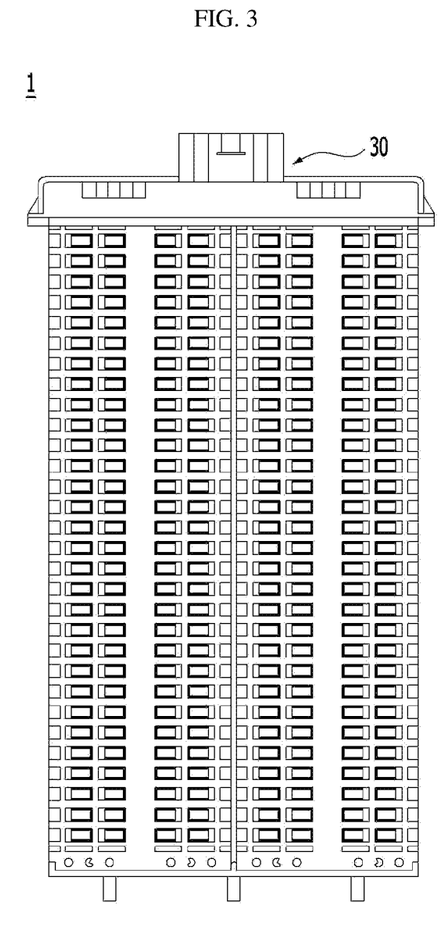
FIG. 3 is a perspective view of a PTC heater according to an embodiment of the present invention.
Figure 4:
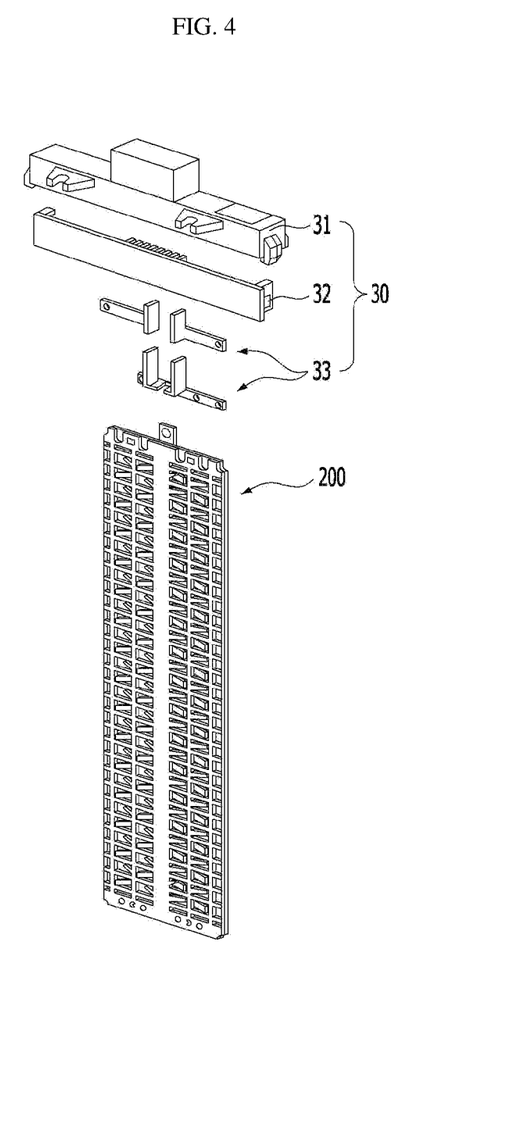
FIG. 4 is an exploded perspective view of FIG. 3.
Figure 5:
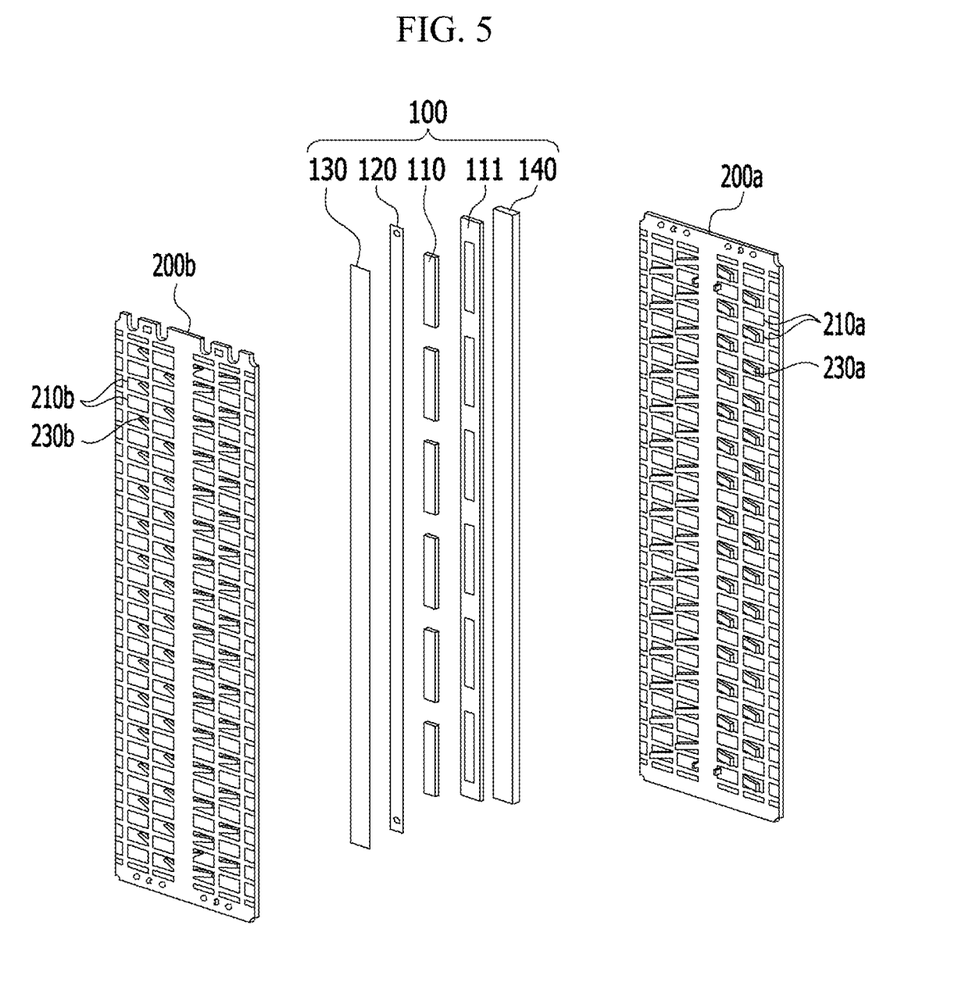
FIG. 5 is an exploded perspective view of a heat dissipating part which is a component illustrated in FIG. 3.

FIG. 3 is a perspective view of a PTC heater according to an embodiment of the present invention, FIG. 4 is an exploded perspective view of FIG. 3, and FIG. 5 is an exploded perspective view of a heat dissipating part which is a component illustrated in FIG. 3.

Referring to FIGS. 3 and 5, a PTC heater 1 according to an embodiment of the present invention may include a housing part 30, a PTC element heating part 100, and a heat dissipating plate 200.

The housing part 30 may fix positions of the PTC element heating part and the heat dissipating plate 200.

A plurality of terminals 33 for supplying power to the PTC element heating part 100 may be provided in the housing part 30. Holders 32 may be provided at two opposite sides of the heat dissipating plate 200 to fix the heat dissipating plate 200 and the PTC element heating part 100. A housing 31 may be connected to the portion where the terminals 33 are connected, thereby fixing the entire structure.

The PTC element heating part 100 may generate heat by being supplied with power.

Referring to FIG. 5, the PTC element heating part 100 may include PTC elements 110, a guide part 111, a current supply part 120, an insulator 130, and a tube 140.

The PTC (positive temperature coefficient) element is a kind of element having properties in which an electrical resistance value increases as a temperature increases. Because of stability accompanied by the properties, the PTC element is widely used for a temperature sensor or a constant-temperature heating element, and the like.

Because the PTC element 110 autonomously prevents a temperature thereof from being increased to a specific temperature or higher, the PTC element does not require a separate temperature control device or a separate safety device during use, such that the number of required components and manufacturing costs may be advantageously reduced. Because the PTC element 110 is a technology already well known, a description thereof will be omitted.

In the present invention, the PTC element 110 is provided in plural, and the plurality of PTC elements 110 may be disposed to be spaced apart from one another at predetermined intervals in order to improve efficiency in transferring heat to the heat dissipating plate 200.

The guide part 111 may have an elongated shape and fix the plurality of PTC elements 110. As an embodiment, the guide part 111 may have fixing holes for fixing the PTC elements 110, and a shape of the fixing hole may be modified in accordance with a shape of the PTC element 110.

The current supply part 120 is disposed above the PTC elements 110 and may be in electrically contact with the PTC elements 110 to provide the PTC elements 110 with the current supplied from the outside. The current supply part 120 is in electrically contact with the terminals 33 disposed in the housing part 30 and may have an elongated shape. The PTC element 110 may generate heat by the current supplied from the current supply part 120.

The insulator 130 is a component disposed above the current supply part 120 and configured to provide electrical insulation for preventing the current, which is supplied from the current supply part 120 so as to be applied to the PTC elements 110, from being transferred directly to the heat dissipating plate 200. The insulator 130 may have an elongated structure having a size equal to or larger than a size of the current supply part 120 and prevent contact with the heat dissipating plate 200. If the current flows without being blocked by the insulator 130, other devices may be damaged, or a loss of power may occur.

As an embodiment, an insulation member used for the insulator 130 does not have electrical conductivity in relation to electricity but may have thermal conductivity in relation to heat. The purpose of this configuration is to allow the insulator 130 to block the transmission of the current and transfer the heat generated from the PTC elements 110 to the heat dissipating plate 200.

An insulating sheet such as insulating tissue paper, condenser paper, kraft paper, cable paper, absorbent paper, red-rope paper, and pc paper may be used as the insulation member. Glass, polyethylene, Teflon, oxide-based ceramics, and the like may be used as a material for electrical insulation.

The tube 140 may accommodate the PTC elements, the power supply part, and the insulator 130 sequentially disposed. The tube 140 may be made of a metal material in order to transfer the heat generated from the PTC elements 110 and may have an internal space for accommodating the constituent components.

As an embodiment, the tube 140 may have a separable structure. The tube 140 may have a cylindrical shape having a quadrangular cross section so as to be in surface contact with the heat dissipating plate 200 and have a separable structure to easily accommodate the constituent components.

The pair of heat dissipating plates 200 may be provided and in contact with the PTC element heating part 100 so as to face each other. The heat dissipating plate 200 may include a contact portion being in contact with the PTC element heating part 100, and a heat dissipating portion from which the heat transferred through the contact portion is dissipated. A plurality of flow holes 210 is provided in the heat dissipating portions at the two opposite sides of the contact portion, and a heat dissipating fin 230 may be connected to one side of each of the flow holes 210. The heat dissipating fin 230 is bent to a space between the pair of heat dissipating plates 200, which is defined by coupling the pair of heat dissipating plates, and may exchange heat with the fluid (air) passing through the heat dissipating plates 200.

Because the heat is transferred on the basis of the contact portion, the heat dissipating portions in which the flow holes 210 and the heat dissipating fins 230 are disposed are provided to be vertically symmetric with respect to the contact portion, and as a result, the heat may be uniformly dissipated to the two opposite sides.

The heat dissipating fins 230 may be bent to the space defined between the heat dissipating plates 200 to increase contact time with the fluid, thereby improving heat exchange efficiency. The heat dissipating fin 230 was a component removed when the heat dissipating plate 200 in the related art is manufactured. However, in the present invention, an overall hole shape is not removed when the flow hole 210 is formed, but a part of the heat dissipating plate 200 may be cut to be kept connected to one side of the hole shape and then bent and disposed in the space. Therefore, the heat dissipating fin 230 may be provided without requiring a separate component needed to manufacture the heat dissipating fin 230.

As an embodiment, the flow hole 210 may have a rectangular shape having horizontal and vertical lengths different from each other. In this case, the heat dissipating fin may be connected to a side having a short length, thereby dissipating the transferred heat to the outside.

The flow holes 210 formed in the heat dissipating plate 200 may be disposed in a plurality of columns or rows. The purpose of this configuration is to maximally increase a heat exchange area within a given area. As an embodiment, the flow holes 210 may be disposed on the heat dissipating plate 200 in a plurality of linear rows and columns.

The heat dissipating plates 200 include a first heat dissipating plate 200*a* and a second heat dissipating plate 200*b* disposed to face each other, and a first flow hole 210*a* formed in the first heat dissipating plate 200*a* and a second flow hole 210*b* formed in the second heat dissipating plate 200b may be disposed to face each other. The purpose of this configuration is to form a flow of the fluid passing through the flow holes 210.

Figure 6:
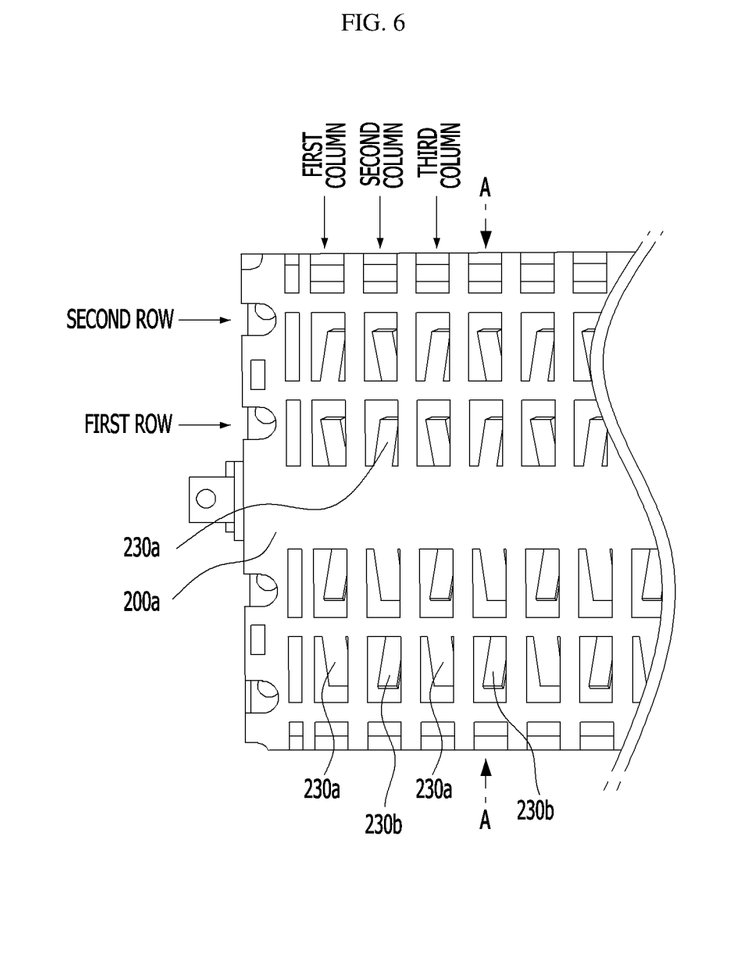
FIG. 6 is an enlarged view of FIG. 3.
Figure 7:
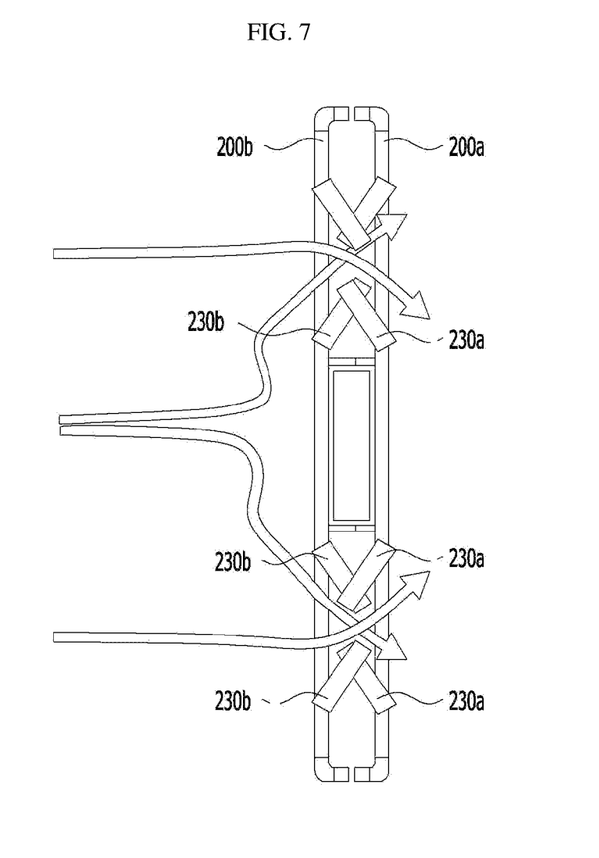
FIG. 7 is a cross-sectional view taken along line A-A' and illustrating the heat dissipating part which is the component illustrated in FIG. 6.
Figure 8:
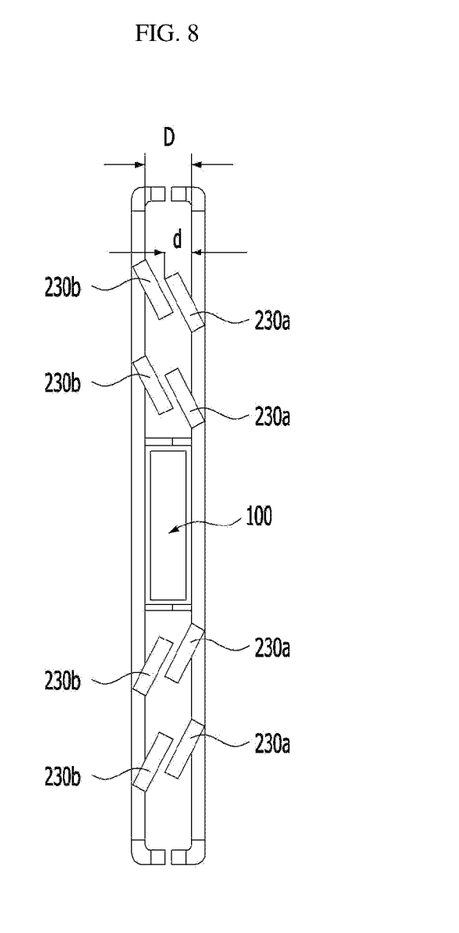
FIG. 8 is a view illustrating an embodiment of the heat dissipating part which is the component illustrated in FIG. 3.

FIG. 6 is an enlarged view of FIG. 3, FIG. 7 is a cross-sectional view taken along line A-A' and illustrating the heat dissipating part which is the component illustrated in FIG. 6, and FIG. 8 is a view illustrating another embodiment of the heat dissipating part which is the component illustrated in FIG. 3.

Referring to FIGS. 6 and 8, the heat dissipating fins 230 disposed in the plurality of columns in the first heat dissipating plate 200a and the second heat dissipating plate 200b may be alternately disposed in the flow holes 210. A size of the space between the first heat dissipating plate 200a and the second heat dissipating plate 200b coupled to each other is limited.

In order to dispose the heat dissipating fins 230 in the limited space, in the same row on the first heat dissipating plate 200a, the heat dissipating fins 230 may be disposed in the first column, the heat dissipating fins 230 may not be disposed in the second column, and the heat dissipating fins 230 may be disposed in the third column. In this case, in the same row on the second heat dissipating plate 200b, the heat dissipating fins 230 may not be disposed in the first column, but the heat dissipating fins 230 may be disposed in the second column. Therefore, when the first heat dissipating plate 200a and the second heat dissipating plate 200b are coupled, the heat dissipating fins 230 may be disposed on the first heat dissipating plate 200a and the second heat dissipating plate 200b without interference, such that the space may be efficiently used.

In addition, referring to FIG. 8, when the first flow hole 210a and the second flow hole 210b face each other, the first heat dissipating fin 230a and the second heat dissipating fin 230b may be bent to the same space. In this case, the first heat dissipating fin 230a and the second heat dissipating fin 230b may be disposed at positions obliquely facing each other. This is because the heat exchange area increases as an area of the heat dissipating fins 230 disposed in the space increases.

In this case, there is no limitation to the length of the heat dissipating fin 230. However, in order to prevent the heat dissipating fins 230 from interfering with one another, a maximum depth d by which the first heat dissipating fin 230a and the second heat dissipating fin 230b are bent may be smaller than a spacing distance D between the first heat dissipating plate 200a and the second heat dissipating plate 200b. The introduced air may flow in the space in which the first heat dissipating fin 230a and the second heat dissipating fin 230b face each other, thereby improving heat exchange efficiency.

In addition, the heat dissipating fins 230 in the flow holes 210 disposed in the same row may be disposed in the same direction. As an embodiment, the heat dissipating fins 230 disposed in the flow holes 210 disposed in the row adjacent to the PTC element heating part 100 may be disposed in the flow holes 210 so as to protrude in the same direction. The purpose of this configuration is to improve efficiency in dissipating heat.

The PTC element 110 of the PTC element heating part 100 generates heat by being supplied with the current from the current supply part 120. In this case, the heat dissipating fins 230 may be continuously disposed in the first row of the flow holes 210 of the heat dissipating plate 200 which is in contact with heat generating surfaces of the PTC elements between the first heat dissipating plate 200a and the second heat dissipating plate 200b.

In this case, the heat dissipating fins 230 may be disposed to be bent in the flow holes 210 closest to the PTC elements for generating heat, thereby improving heat exchange efficiency. In the case in which the first heat dissipating plate 200a is in contact with the heat generating surfaces of the PTC elements, the heat dissipating fins 230 may be disposed in all the flow holes 210 disposed in the first row on the first heat dissipating plate 200a.

In the case of the PTC heater 1 configured to heat the air by means of heat exchange, it is important to improve heat exchange efficiency by increasing the contact area between the air and the heat dissipating plate 200. Therefore, the structures of the heat dissipating fins 230 may be disposed to be different in the respective columns or rows.

Figure 9:
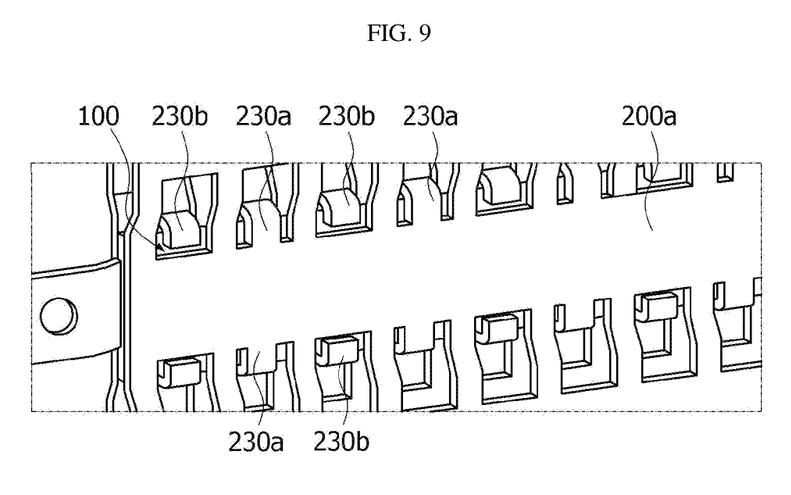
FIG. 9 is a view illustrating an embodiment of the heat dissipating fin which is the component illustrated in FIG. 3.

FIG. 9 is a view illustrating an embodiment of the heat dissipating fin which is the component illustrated in FIG. 3.

Referring to FIG. 9, the heat dissipating fins may be bent to fix the PTC element heating part 100. The PTC element heating part 100 is disposed between the heat dissipating plates 200 disposed to face each other, and the heat dissipated from the PTC element heating part 100 may be dissipated to the outside through the heat dissipating plates 200.

In this case, the PTC element heating part 100 may be fixed by the heat dissipating fins 230. In this case, in order to increase a fixing force, the first heat dissipating fins 230a and the second heat dissipating fins 230b may be bent to alternately surround one side of the PTC element heating part 100.

The heat dissipating fins 230 may be in direct contact with the PTC element heating part 100 while fixing the PTC element heating part 100, thereby improving heat dissipating efficiency.

According to the embodiment of the present invention, it is possible to increase the heat transfer efficiency by improving the structure of the heat dissipating part and to uniformize the surface temperature of the heat dissipating part.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

What is claimed:

1. A positive temperature coefficient (PTC) heater comprising:
    a PTC element heating part configured to generate heat; and
    a pair of heat dissipating plates disposed at two opposite sides of the PTC element heating part, respectively, so as to be in contact with the PTC element heating part and having a plurality of flow holes,
    wherein the heat dissipating plates have heat dissipating fins each connected to one side of each of the flow holes and bent to a space between the heat dissipating plates and the heat dissipating plates comprise a first heat dissipating plate and a second heat dissipating plate disposed to face each other, and a first flow hole formed in the first heat dissipating plate and a second flow hole formed in the second heat dissipating plate are disposed to face each other and the heat dissipating fins are angled to intersect with a direction from the first heat dissipating plate to the second heat dissipating plate or a direction from the second flow hole to the first flow hole, wherein the heat dissipating fins are formed only in one of the first and second flow holes and the other flow hole is not formed with the heat dissipating fin.

2. The PTC heater of claim 1, wherein the flow hole has a rectangular shape having horizontal and vertical lengths different from each other, and the heat dissipating fin is connected to a side having a shorter length.

3. The PTC heater of claim 1, wherein the heat dissipating fins are bent to fix the PTC element heating part.

4. The PTC heater of claim 1, wherein the heat dissipating fins in the flow holes disposed in the same row are disposed in a same direction.

5. The PTC heater of claim 1, wherein when the first flow hole and the second flow hole face each other, a first heat dissipating fin provided on the first heat dissipating plate and a second heat dissipating fin provided on the second heat dissipating plate are disposed at positions obliquely facing each other and bent to the space between the heat dissipating plates.

6. The PTC heater of claim 5, wherein a maximum depth by which the first heat dissipating fin and the second heat dissipating fin are bent is smaller than a spacing distance between the first heat dissipating plate and the second heat dissipating plate.

7. The PTC heater of claim 6, wherein the flow holes and the heat dissipating fins of the first heat dissipating plate and the second heat dissipating plate are symmetrically provided with respect to the PTC element heating part.

8. The PTC heater of claim 5, wherein the flow holes and the heat dissipating fins of the first heat dissipating plate and the second heat dissipating plate are symmetrically provided with respect to the PTC element heating part.

9. The PTC heater of claim 1, wherein the PTC element heating part comprises:
a PTC element;
a current supply part disposed above the PTC element and configured to supply a current;
an insulator disposed above the current supply part; and
a tube configured to accommodate the PTC element, the current supply part, and the insulator sequentially disposed, and
wherein the heat dissipating fins are disposed in a first row of the flow holes of the heat dissipating plate which is in contact with a heat generating surface of the PTC element between the first heat dissipating plate and the second heat dissipating plate.

10. The PTC heater of claim 9, wherein the flow holes and the heat dissipating fins of the first heat dissipating plate and the second heat dissipating plate are symmetrically provided with respect to the PTC element heating part.

11. The PTC heater of claim 1, wherein the flow holes and the heat dissipating fins of the first heat dissipating plate and the second heat dissipating plate are symmetrically provided with respect to the PTC element heating part.

* * * * *